US007340526B2

(12) United States Patent
Kime et al.

(10) Patent No.: US 7,340,526 B2
(45) Date of Patent: Mar. 4, 2008

(54) AUTOMATED CONTENT SOURCE VALIDATION FOR STREAMING DATA

(75) Inventors: Gregory C. Kime, Portland, OR (US); Rama R. Menon, Portland, OR (US); Reed J. Sloss, Redmond, OR (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 10/016,740

(22) Filed: Oct. 30, 2001

(65) Prior Publication Data

US 2003/0084179 A1    May 1, 2003

(51) Int. Cl.
G06F 15/16 (2006.01)
(52) U.S. Cl. .................................. 709/231; 709/227
(58) Field of Classification Search ............. 709/227, 709/229, 231; 713/200, 201; 726/5
See application file for complete search history.

(56) References Cited

U.S. PATENT DOCUMENTS

| 5,602,992 | A | | 2/1997 | Danneels | |
|---|---|---|---|---|---|
| 5,758,194 | A | | 5/1998 | Kuzma | |
| 5,958,051 | A | * | 9/1999 | Renaud et al. | 713/200 |
| 6,065,119 | A | * | 5/2000 | Sandford et al. | 713/200 |
| 6,073,124 | A | * | 6/2000 | Krishnan et al. | 705/59 |
| 6,173,406 | B1 | * | 1/2001 | Wang et al. | 713/201 |
| 6,480,961 | B2 | * | 11/2002 | Rajasekharan et al. | 713/200 |
| 6,546,113 | B1 | * | 4/2003 | Lucas et al. | 382/100 |
| 6,606,393 | B1 | * | 8/2003 | Xie et al. | 382/100 |
| 6,738,815 | B1 | * | 5/2004 | Willis et al. | 709/225 |
| 2001/0051928 | A1 | * | 12/2001 | Brody | 705/52 |
| 2002/0023169 | A1 | * | 2/2002 | Ponzio, Jr. | 709/232 |
| 2002/0138736 | A1 | * | 9/2002 | Morin | 713/180 |
| 2003/0084179 | A1 | * | 5/2003 | Kime et al. | 709/231 |
| 2003/0123659 | A1 | * | 7/2003 | Forstrom et al. | 380/205 |
| 2004/0030784 | A1 | * | 2/2004 | Abdulhayoglu | 709/227 |

OTHER PUBLICATIONS

H. Schulzrinne, A. Rao, R. Lanphier; Real Time Streaming Protocol (RTSP);Internet Engineering Task Force; Feb. 2, 1998; http://www.cs.columbia.edu/~hgs/rtsp/draft/draft-ietf-mmusic-rtsp-09.pdf.

* cited by examiner

Primary Examiner—Jason Cardone
Assistant Examiner—Aaron Strange
(74) Attorney, Agent, or Firm—Blakely, Sokoloff, Taylor & Zafman LLP

(57) ABSTRACT

One or more validation keys are embedded in a data stream at a server. A client requests the data stream from the server. The server sends the data stream to the client. The client receives the data stream, and samples the data stream to detect one or more validation keys.

21 Claims, 5 Drawing Sheets

| SERVER URL | VALIDATION KEYS |
|---|---|
| rtsp://www.mediaserver1/example_stream1 | E106 |
| rtsp://www.mediaserver1/example_stream2 | 24A6 |
| rtsp://www.mediaserver1/example_stream3 | F94A |
| rtsp://www.mediaserver1/example_stream4 | 52A6 |

AUTOMATED CONTENT SOURCE VALIDATION FOR STREAMING DATA

FIELD OF THE INVENTION

The present invention relates to the field of electronic content distribution. More particularly, the present invention relates to the field of streaming media content distribution.

BACKGROUND

Streaming is a technique for transferring data such that it can be processed as a steady and continuous stream. Many real-time events, such as live news items, have to be streaming events or else they may become much less relevant and less valuable. Also, streaming allows a personal computer (PC) user connected to the Internet to play a multimedia file, such as an audio or video file, in real time without having to wait for the entire file to be downloaded. This is important because many users do not have fast enough access to the Internet to download a large multimedia file in an adequately short amount of time. Typically, data streams are generated and distributed by streaming content providers (SCPs).

An SCP may map a data stream to a Uniform Resource Locator (URL) to provide users access to the data stream through readily available player programs, which are commonly integrated with Internet browser programs. To begin a viewing or listening session, a user may direct a player program or browser program to the URL of a desired data stream. However, if the URL mapping of the desired data stream is incorrect, the user may receive an unexpected data stream. As an example, a user expecting classical music may receive hard rock music. Incorrect URL mappings may be introduced through various elements in distribution logic used to deliver the data stream from its source to the end user.

An SCP may provide streaming content generation and delivery services to resellers of streaming content, such as Internet radio stations and Internet service providers (ISPs), who provide end users access to the streaming content. It is common for a service level agreement (SLA) between an SCP and a reseller to include a provision that commits the SCP to a specified level of content delivery accuracy, as well as penalty provisions if the specified level of accuracy is not achieved.

In today's Internet content delivery systems, there are no mechanisms to bind a URL and the content it represents, ensuring that the intended content gets delivered to users. Therefore, in an attempt to assure accuracy, an SCP may employ human operators to direct a player program to the URL of a data stream in order to validate the content is streamed from the expected source. To employ human operators for content source validation (CSV) is expensive and directly impacts scalability of operations due to the limited number of data streams a human operator can validate. Further, because the process involves human interaction, the possibility of human error exists.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The following detailed description sets forth an embodiment or embodiments in accordance with the present invention. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

An embodiment of the present invention provides a method of automated content source validation (CSV) for streaming data. Validation keys indicative of a content source are embedded in the data stream at a server from where the content is served. A client requests the data stream and samples a received data stream to detect the presence of validation keys to ensure that the content received is from the expected source. The presence of validation keys indicates the received data stream is the requested data stream, while absence of validation keys may indicate an incorrect URL mapping may have occurred.

An Exemplary Streaming Content Delivery Network

Figure 1:
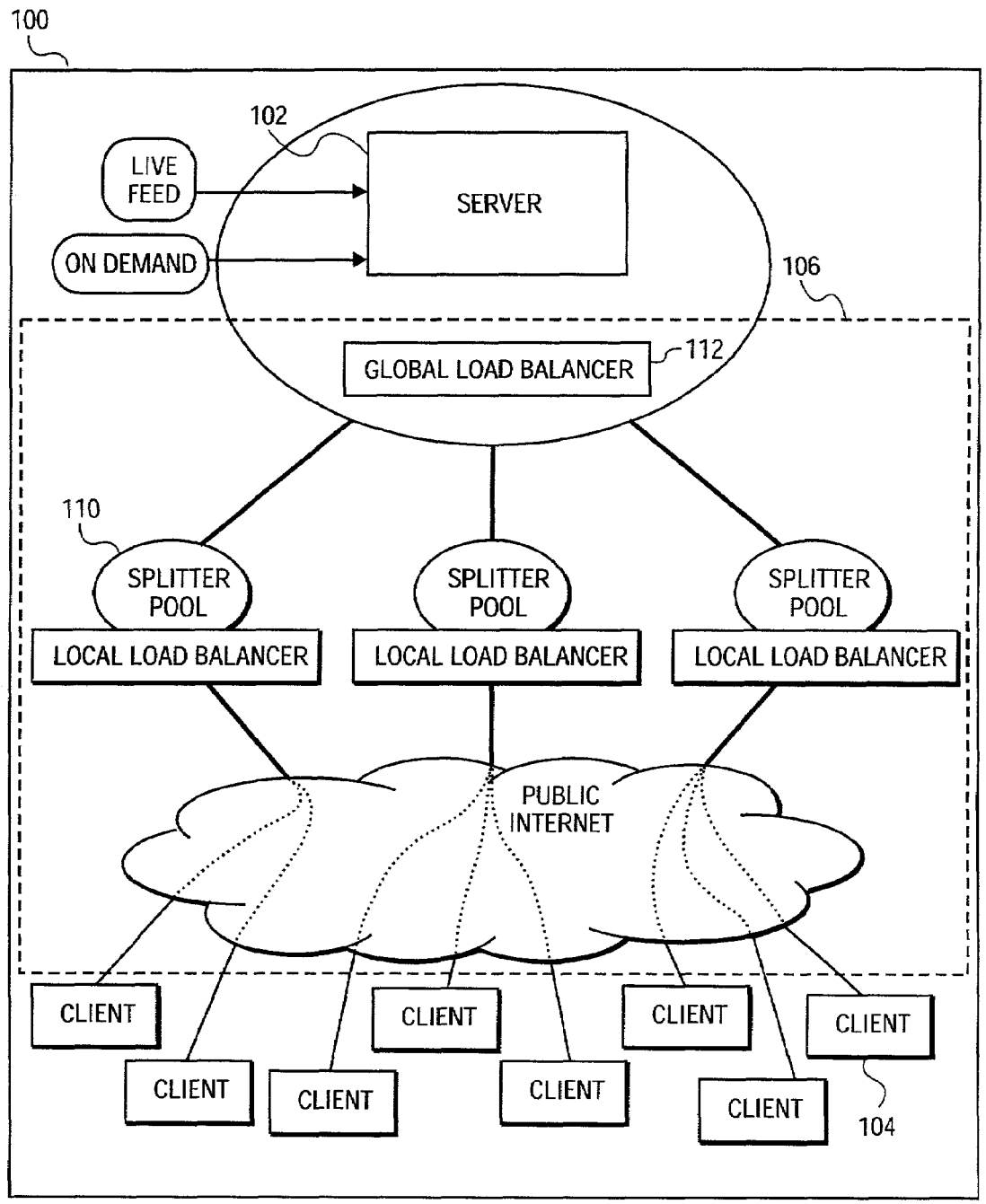
FIG. 1 shows a global view of an exemplary streaming content delivery network (SCDN) capable of performing automated content source validation (CSV).

FIG. 1 illustrates a global view of an exemplary streaming content delivery network (SCDN) 100 of a streaming content provider (SCP) capable of performing automated CSV of a data stream, according to one embodiment of the present invention. As illustrated, for one embodiment, SCDN 100 comprises a server 102, clients, such as client 104 and distribution logic 106.

Server 102 may comprise any suitable computer system and equipment to generate and deliver streaming media content to other computer systems, such as client 104, through distribution logic 106. Distribution logic 106 may comprise a public network, such as the Internet, a private network, such as a corporate network, or any combination of suitable public and private networks. Server 102 may acquire a media signal, and encode the media signal to create a data stream. The media signal may be acquired from a live feed of an event, as illustrated, or from a prerecorded source, such as a prerecorded song or video that may be delivered on demand.

For one embodiment, encoding may comprise sampling the media signal and compressing the resulting information so that it can efficiently be sent over the Internet. As an example, because many users connect to the Internet using 28.8 kilobits per second (kbps) modems, server 102 may comprise an encoder to compress an audio signal into a 20 kbps audio data stream. To provide users access to the data stream, server 102 may map the data stream to a uniform resource locator (URL).

Client 104 may comprise any suitable computer system to receive streaming media content from server 102 through distribution logic 106. For one embodiment, client 104 is a personal computer (PC) of an end user connected to the Internet, for example, through a dial-up modem or a broadband connection. Client 104 may comprise a player program capable of playing streaming media content. Examples of the player program include Windows Media™ Player available from Microsoft Corporation and RealPlayer® available from RealNetworks, Inc. The player program may be integrated into an Internet browser program as a plug-in application that is loaded when the browser program detects an incoming data stream of an appropriate format. Examples of the Internet browser program include Internet Explorer available from Microsoft Corporation and Netscape Navigator® available from Netscape Communications Corporation.

Therefore, the end user may request to play a data stream by directing the player program to the URL of the data stream directly, or from a browser program. However, the end user may receive an unexpected data stream due to an incorrect URL mapping of the data stream. One opportunity to introduce incorrect URL mappings may arise when a list of URLs is compiled by a reseller. For example, an Internet radio station may generate a song playlist by compiling a list of URLs for various audio streams. Incorrect mappings may also be introduced by elements throughout distribution logic 106 which may generate URL mappings, such as splitters and load balancers.

A splitter is a server capable of receiving a data stream from a source server and splitting the data stream to deliver copies, or split data streams, to a plurality of clients. As an example, server 102 may deliver a data stream to one or more splitters in an effort to provide streaming content to a larger audience of end users. Typically, a group of splitters, such as splitter pool 110, is managed by a local load balancer so that the load on each splitter is managed by the local load balancer. A global load balancer, such as global load balancer 112, may attempt to balance the load on a network by redirecting traffic to different splitter pools. As an example, while a user may request a data stream from a first server using a first URL, a global load balancer may re-map the request to a second URL to access a copy of the data stream on one of several splitter pools managed by local load balancers.

Automated Source Content Validation

Figure 2:
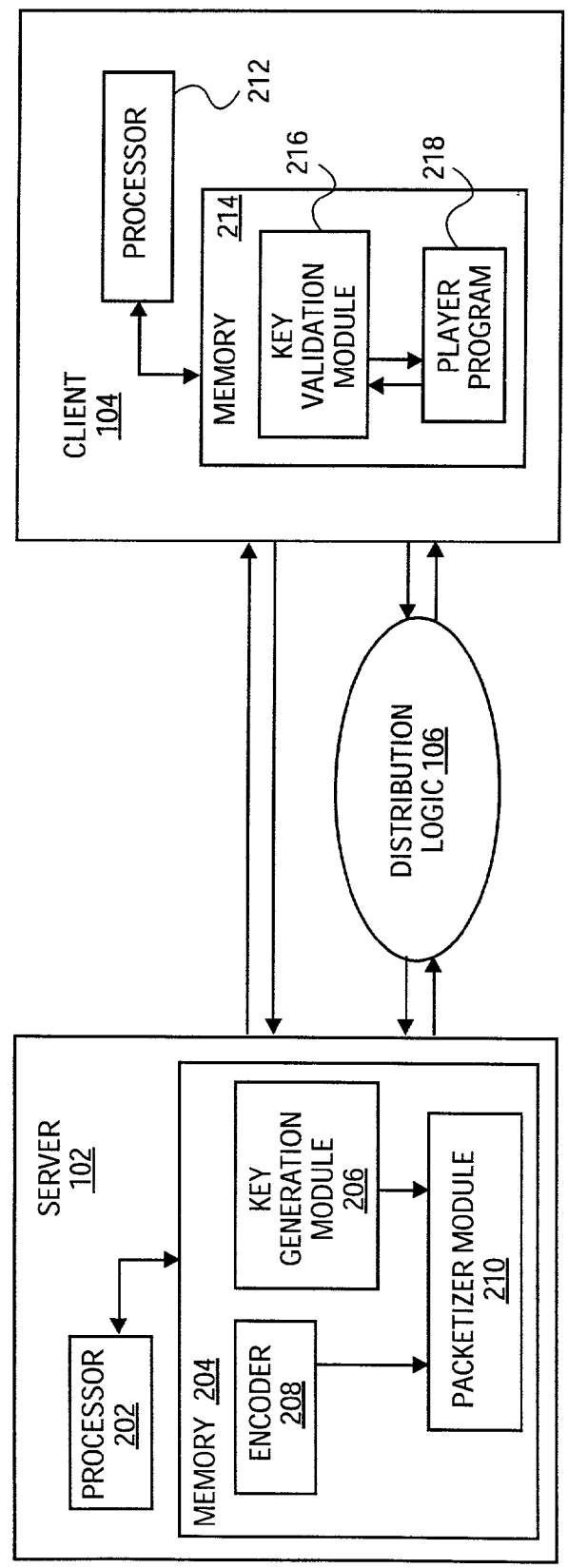
FIG. 2 shows a server-client view of an exemplary SCDN capable of performing automated CSV.

FIG. 2 illustrates a client-server view of SCDN 100 that provides further details of server 102 and client 104, according to one embodiment of the present invention.

As illustrated, server 102 may comprise a processor 202 and a memory 204, to store data and instructions for execution by processor 202. For one embodiment, memory 204 may have stored therein a set of instructions to implement a key generation module (KGM) 206, an encoder 208, and a packetizer module 210. For another embodiment, KGM 206 and/or encoder 206 may comprise hardware circuitry.

Encoder 208 may encode a media signal to create a data stream of an appropriate format. KGM 206 may generate validation keys to be embedded in a data stream created by encoder 208. Validation keys may be of any suitable format, and may be generated according to any suitable algorithm. For one embodiment, validation keys may comprise 32-bit numbers.

For one embodiment, packetizer module 210 may create packets of streaming data by appropriately fragmenting a continuous encoded bit stream from encoder 208 such that the data packet size fits within network imposed limits. As illustrated, encoder 208 may generate encoded data which is fed to packetizer module 210, while KGM 206 may generate validation keys which are fed to packetizer module 210.

As illustrated, client 104 may comprise a processor 212 and a memory 214, to store data and instructions for execution by processor 212. For one embodiment, memory 214 may have stored therein a set of instructions to implement a key validation module (KVM) 216 and a player program 218. As previously described, a player program, such as player program 218 is capable of playing multimedia data streams, such as audio or video streams, or any other type of data streams.

KVM 216 may detect validation keys embedded in a data stream. For one embodiment, KVM 216 compares validation keys detected in a data stream received by player program 218 to validation keys received separately. For one embodiment, KVM 216 maybe a plug-in module for player program 218 that enables player program 218 to play data streams with embedded keys.

While, as illustrated, server 102 and client 104 may comprise memory 204 and memory 214, respectively, each may comprise any machine-readable medium, including any mechanism that provides (i.e., stores and/or transmits) information in a form readable by a machine (e.g., a computer). For example, a machine-readable medium includes storage mediums such as read only memory (ROM); random access memory (RAM); magnetic disk storage media; optical storage media; and flash memory devices; as well as transmission mediums such as electrical, optical, acoustical or other form of propagated signals (e.g., carrier waves, infrared signals, digital signals, etc.); etc.

Figure 3:
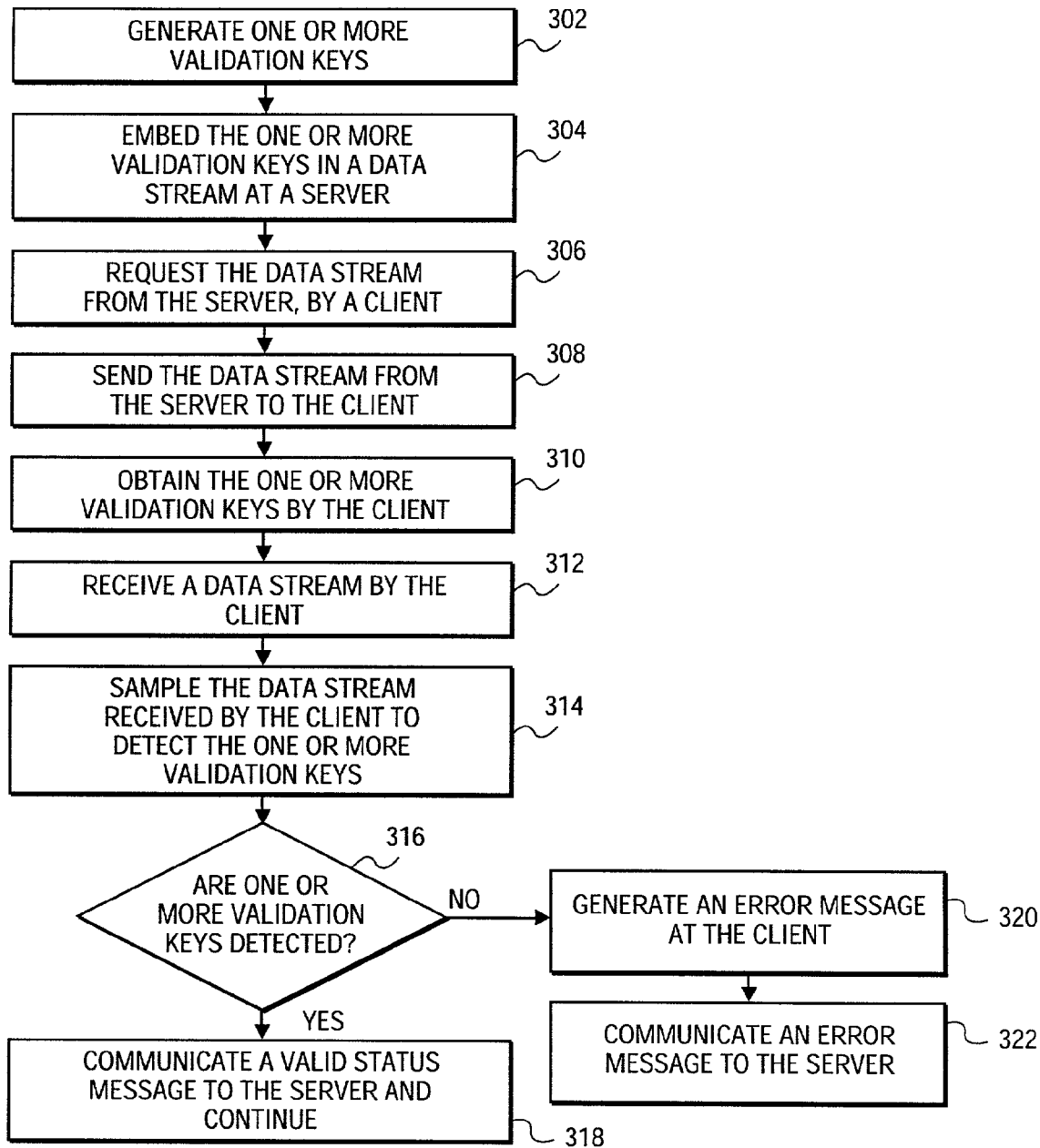
FIG. 3 shows a flow diagram describing the operation of content source validation according to one embodiment of the present invention.

Flow diagram 300, of FIG. 3, illustrates the operation of automated content source validation (CSV) for streaming data according to one embodiment of the present invention. For block 302, KGM 206 generates one or more validation keys. For another embodiment, validation keys may be generated externally and supplied to server 102 by an external source. Validation keys may be stored in a database at server 102.

A data stream created by encoder 208 may be mapped to a URL. For one embodiment, KGM 206 may implement a function VK(URL, EK) that generates validation keys based on the URL and an encryption key EK. Thus, a unique validation key may be generated automatically based on a URL for the data stream. Server 102 may send the encryption key EK to client 104 to enable client 104 to generate validation keys locally.

For block 304, packetizer module 210 embeds the one or more validation keys in a data stream at the server. For another embodiment, encoder 208 may embed one or more validation keys in a data stream during the process of encoding a media signal to create the data stream. For one embodiment, encoder 208 may create data streams without validation keys embedded for play by player programs that are not capable of performing CSV.

Validation keys may be embedded in the data stream according to various methods. Validation keys may be embedded at random or predetermined intervals. For one embodiment, packetizer 210 may add validation keys generated by KGM 206 to data packets such that validation keys are present in one of every N data packets (i.e. if N=1, every data packet would contain validation keys). For one embodiment, N may be determined based on considerations such as network overhead and reliability.

Figure 4:
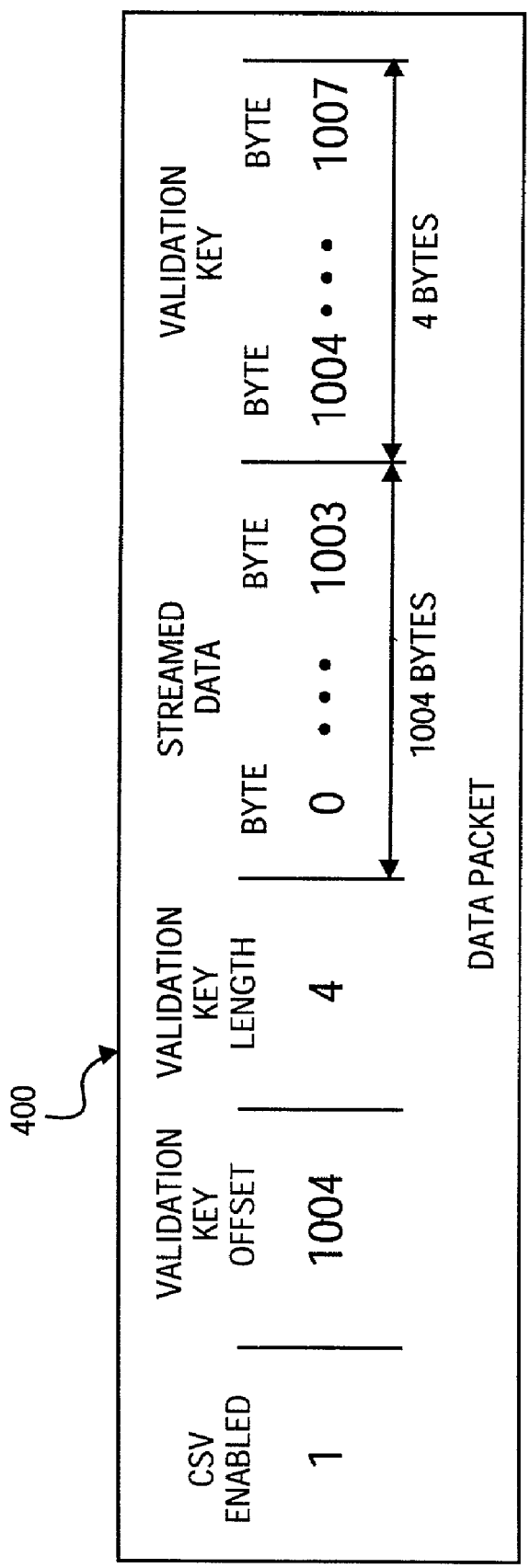
FIG. 4 shows an exemplary data packet with a location and a length of an embedded key identified in a packet header.

FIG. 4 illustrates, for one embodiment, a data packet 400 having a packet header that specifies an offset location and length of a validation key embedded in the data packet. As illustrated, the first field indicates the data packet contains a validation key, the second field specifies a validation key is located in the data at an offset location of 1004, and the third field indicates the size of the validation key is 4 bytes. In other words, a player program that receives the data packet may parse the data packet to determine a 4-byte validation key is included in the data packet following 1004 bytes of streaming data. For one embodiment, a data packet may contain more than one validation key.

In another embodiment, a validation key may be embedded in a data stream wrapped by predetermined data. For example, a validation key of a predetermined byte length may be preceded, and trailed by, predetermined byte sequences. The player program may detect the predetermined byte sequences which indicate the data in between is a validation key. Careful selection of the byte sequences can greatly reduce the likelihood of the byte sequences occurring naturally in a data stream, which may result in an incorrect content source validation.

For block 306, client 104 requests the data stream from server 102. The request may result from an end user directing player program 218 to the URL of the data stream. For block 308, server 102 sends the data stream to client 104.

For block 310, client 104 obtains the one or more validation keys. For one embodiment, the one or more validation keys are sent by server 102 to client 104 through distribution logic 106, in response to a request for the data stream. For one embodiment, server 102 sends the one or more validation keys to client 104 through a first connection between server 102 and client 104 prior to, or while, sending the data stream to client 104 through a second connection between server 102 and client 104.

For another embodiment, client 104 obtains the one or more validation keys prior to requesting the data stream. For example, client 104 may receive a formatted electronic mail (email) message containing validation keys, download validation keys from a website or install them as an automatic update for player program 218. Alternatively, client 104 may obtain validation keys from a storage medium, such as a floppy disk, a compact disk read only memory (CD-ROM), or other storage medium known or not yet developed.

Figure 5:
FIG. 5 shows an exemplary database to store validation keys with associated uniform resource locators (URLs).

Validation keys obtained by client 104 may be stored in a database at client 104. FIG. 5 illustrates an exemplary database 500 to store 32-bit validation keys with associated URLs. For example, when player program 218 requests a data stream with the URL "rtsp://www.mediaserver1/example_stream1" KVM 216 may retrieve the validation key E106xH (hexadecimal format) from database 500. For another embodiment, a URL for a data stream may be associated with more than one validation key.

For another embodiment, client 104 may generate validation keys for a requested data stream locally as a function VK(URL, EK) of a URL of a requested data stream and an encoder key EK. For example, rather than obtain validation keys, client 104 may obtain encoder key EK from server 102 to generate validation keys as a function of the URL of a requested data stream.

For block 312, client 104 receives a data stream. The data stream received by client 104 may or may not be the data stream requested by client 104. For example, if a URL for the requested data stream is incorrectly mapped at server 102, or at any point in distribution logic 106, the received data stream may not be the same as the requested data stream.

For block 314, client 104 samples the data stream received by client 104 to detect the one or more validation keys. For one embodiment, KVM 216 samples the data stream received by client 104, extracts detected validation keys, and outputs a data stream without embedded validation keys for play by player program 218.

For block 316, if one or more validation keys are detected, the data stream received by the client is validated as being the requested data stream, and the YES branch is taken. A data stream received by client 104 may be validated if fewer than all of the one or more validation keys are detected. For one embodiment, if a predetermined number of the one or more validation keys are detected, the received data stream is validated. The predetermined number may be adjusted to accommodate poor connections which result in lost data packets.

For block 318, client 104 communicates a valid status message to server 102 and continues processing the data stream. Server 102 may, for example, after sending a data stream from server 102 to client 104, monitor a connection between server 102 and client 104 for a valid status message. Absence of the valid status message from client 104 may indicate a network delivery error. For one embodiment, server 102 may generate an alarm message if a predetermined amount of time passes without receiving a valid status message from client 104 to notify appropriate personnel of a potential network delivery error.

For one embodiment, a data stream may be validated by client 104 the first time one or more validation keys are detected in the data stream, and client 104 may cease to sample the data stream thereafter. For another embodiment, client 104 may continue to sample the data stream to detect validation keys while the data stream is received by client 104.

If one or more validation keys are not detected, for block 316, the data stream received by client 104 is invalidated as being different than the requested data stream and the NO branch is taken. For one embodiment, if a predetermined number of validation keys are not detected, the received data stream is invalidated. Absence of validation keys in the received data stream may indicate an incorrect URL mapping of the requested data stream.

For block 320, an error message is generated at client 104, to indicate a CSV error has occurred. The error message may allow a user to retry, for example, to request the data stream from server 102 again, or exit without retrying. For one embodiment, KVM 216 may generate an error message if a predetermined maximum amount of streaming data is received without detecting a validation key. Similarly, KVM 216 may generate an error message if a requested data stream is not received in a predetermined maximum time period. For one embodiment, player program 218 may disable CSV in order to play data streams without validation keys embedded.

For block 322, client 104 communicates an error message to server 102, to indicate a CSV error has occurred. When a CSV error is received by server 102, for example, appropriate personnel may be notified of a possible network delivery error. For one embodiment, diagnostic information may be included with the error message, such as the URL of the requested data stream and any validation keys detected in the received data stream. Such diagnostic information may assist appropriate personnel in determining the source of the error, for example, where an incorrect URL mapping may have occurred.

For one embodiment, client 104 may establish a connection with server 102 through distribution logic 106 that is separate from a connection through which a data stream is received. Such a connection, often called an out-of-band connection, may be used to communicate CSV status messages to server 102, while client 104 receives the data stream. An out-of-band connection may provide further automation, enabling server 102 to take appropriate action to correct a CSV error and monitor the out-of-band connection to determine if the error is still present.

For one embodiment, a log file may be created and updated based on CSV results. The log file may be created at server 102 and/or client 104. For example, the log file may contain data indicative of the number of successful and unsuccessful validations that occurred for a particular data stream, along with associated time stamps. This data could be used to determine a measure of content delivery accuracy. Such a measure may be useful in determining if a level of content delivery accuracy specified in a service level agreement (SLA) between a streaming content provider (SCP) and a reseller has been achieved. For one embodiment, a log file generated at client 104 may be uploaded periodically by server 102.

For one embodiment, specific versions of key validation modules (KVMs) may integrate with existing, readily available player programs, as plug-in modules, to enable the player programs to perform automated CSV. For example, one plug-in module may integrate with Windows Media™ Player available from Microsoft Corporation, while another plug-in module may integrate with RealPlayer® available from RealNetworks, Inc.

For one embodiment, a system may provide an SCP with automated content source validation. For example, referring back to FIG. 1, an SCP may establish one or more clients, such as client 104, downstream of distribution logic 106 used to deliver streaming content from server 102 to the one or more clients. The clients may be physically located to access streamed content through different paths in the distribution logic, for example through different splitter pools 110. Special player programs at the clients may be programmed, for example, to periodically access streamed content provided by the SCP through a list of URLs. Diagnostic information received from the different clients may provide the SCP with greater assurance content is streaming properly through different paths in distribution logic 106, or may indicate elements in distribution logic 106 that may have introduced problems.

While the description above illustrated embodiments to detect incorrect URL mappings, content source validation (CSV) may be used for a variety of purposes. For example, validation keys may be embedded in a data stream to identify content of the data stream as not intended for a certain group of users. For example, rating information (G, PG, etc.) may be provided for parental control. Player programs may be developed with certain modes that prohibit play of data streams identified by such validation keys. Validation keys for other types of restricted material, such as copyrighted material, or pay-per-view content, may be distributed only to authorized users.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:

generating a unique validation key associated with a data stream, the unique validation key to map the data stream with a source, wherein the unique validation key is generated based on a combination of a uniform resource locator (URL) and an encryption key;

storing the unique validation key;

sending the unique validation key to the client at the associated destination;

receiving a request for a data stream from the client after sending the unique validation key to the client;

generating the data stream;

embedding the unique validation key in the data stream to form a validation key embedded data stream, wherein the validation key embedded data stream is to ensure that the data stream includes content intended for an associated destination, wherein the validation key is embedded in the data stream wrapped by predetermined data, the predetermined data including a number of predetermined bytes to precede and trail the validation key; and sending the validation key embedded data stream to the client at the associated destination.

2. The method of claim 1, wherein the source comprises one or more of a source of audio information, a source of video information, and a source of audio-video information and the URL.

3. The method of claim 2, wherein the generating of the unique validation key associated with the data stream comprises generating the unique validation key in response to a request for data to be retrieved from the URL.

4. The method of claim 2, wherein the data stream comprises one or more of encoded video information, encoded audio information, encoded audio-video information, and encoded information from the URL.

5. The method of claim 4, further comprising:

and sampling the validation key embedded data stream in response to detecting the unique validation key in the validation key embedded data stream.

6. A method comprising:

receiving a unique validation key associated with a data stream, the unique validation key to map the data stream with a source, wherein the unique validation key received is generated based on a combination of a uniform resource locator (URL) and an encryption key;

storing the unique validation key;

requesting a data stream after receiving the unique validation key;

receiving the data stream;

sampling the data stream to detect the unique validation key embedded in the data stream, wherein the validation key embedded data stream is to ensure that the data stream includes content intended for an associated destination, wherein the validation key is embedded in the data stream wrapped by predetermined data, the predetermined data including a number of predetermined bytes to precede and trail the validation key; and validating the data stream in response to detecting the unique validation key embedded in the data stream.

7. The method of claim 6, wherein the source comprises one or more of a source of audio information, a source of video information, and a source of audio-video information and the URL.

8. The method of claim 7, further comprising requesting data to be retrieved from the URL.

9. The method of claim 6, further comprising generating an error if the unique validation key is not detected in the data stream.

10. The method of claim 9, further comprising:
creating a log file; and
writing the error to the log file.

11. An apparatus, comprising:
a database;
a server coupled with the database and an associated destination, the associated destination including a client, the server to receive a request for a data stream, the server having
a processor, and
a memory coupled with the processor, the memory including
a key generation module (KGM) to generate a unique validation key associated with the data stream and send the unique validation key to the client at the associated destination prior to receiving the request for the data stream, the unique validation key to map the data stream with a source, wherein the unique validation key is generated based on a combination of a uniform resource locator (URL) and an encryption key; and
an encoder to embed the unique validation key in the data stream to form a validation key embedded data stream, wherein the validation key embedded data stream is to ensure that the data stream includes content intended for an associated destination, wherein the validation key is embedded in the data stream wrapped by predetermined data, the predetermined data including a number of predetermined bytes to precede and trail the validation key;
the database to store the unique validation key; and
the server to send the validation key embedded data stream to the associated destination.

12. The apparatus of claim 11, wherein the source comprises one or more of a source of audio information, a source of video information, and a source of audio-video information, and the URL.

13. The apparatus of claim 12, wherein the encoder encodes one or more of audio information, video information, and the URL.

14. A system, comprising:
a server coupled with a client and a database, the server to receive a request for a data stream, the server including
a key generation module (KGM) to generate a unique validation key associated with the data stream and send the unique validation key to the client at the associated destination prior to receiving the request for the data stream, the unique validation key to map the data stream with a source, wherein the unique validation key is generated based on a combination of a uniform resource locator (URL) and an encryption key; and
an encoder to embed the unique validation key in the data stream to form a validation key embedded data stream, wherein the validation key embedded data stream is to ensure that the data stream includes content intended for an associated destination, wherein the validation key is embedded in the data stream wrapped by predetermined data, the predetermined data including a number of predetermined bytes to precede and trail the validation key;
the client to receive the validation key embedded data stream; and
the database to store the unique validation key.

15. The system of claim 14, wherein the source comprises one or more of a source of audio information, a source of video information, and a source of audio-video information and the URL.

16. The system of claim 15, wherein the associated client requests data to be retrieved from the URL.

17. The system of claim 14, wherein the associated client generates an error if the unique validation key is not detected in the data stream.

18. The system of claim 17, wherein a server creates a log file and writes the error to the log file.

19. A machine-readable storage medium comprising instructions, which when executed by a machine, cause the machine to:
generate a unique validation key associated with a data stream, the unique validation key to map the data stream with a source, wherein the unique validation key is generated based on a combination of a uniform resource locator (URL) and an encryption key;
store the unique validation key;
send the unique validation key to the client at the associated destination;
generate the data stream in response to a request for the data stream received from the client after sending the unique validation key to the client;
embed the unique validation key in the data stream to form a validation key embedded data stream, wherein the validation key embedded data stream is to ensure that the data stream includes content intended for an associated destination, wherein the validation key is embedded in the data stream wrapped by predetermined data, the predetermined data including a number of predetermined bytes to precede and trail the validation key; and
send the validation key embedded data stream to the client at the associated destination.

20. The machine-readable storage medium of claim 19, wherein the instructions when executed, further cause the machine to sample the data stream to detect the unique validation key embedded in the data stream.

21. The machine-readable storage medium of claim 19, wherein the instructions when executed, further cause the machine to generate the data stream, wherein the source is one or more of audio information, video information, and audio-video information.

* * * * *